US 7,486,083 B2

(12) United States Patent  
Manning et al.

(10) Patent No.: US 7,486,083 B2
(45) Date of Patent: Feb. 3, 2009

(54) MANAGING SYSTEM STABILITY

(75) Inventors: Michael Manning, Hopkinton, MA (US); Ashok Tamilarasan, Framingham, MA (US)

(73) Assignee: EMC Corporation, Hopkinon, MA (US)

( * ) Notice: Subject to any disclaimer, the term of this patent is extended or adjusted under 35 U.S.C. 154(b) by 115 days.

(21) Appl. No.: 11/640,669

(22) Filed: Dec. 18, 2006

(65) Prior Publication Data

US 2008/0144470 A1  Jun. 19, 2008

(51) Int. Cl.
G01R 31/02 (2006.01)
G06F 13/00 (2006.01)

(52) U.S. Cl. ........................ 324/537; 711/114
(58) Field of Classification Search ............. 324/537; 711/114

See application file for complete search history.

(56) References Cited

U.S. PATENT DOCUMENTS 5,890,214 A * 3/1999 Espy et al. ............... 711/114
6,430,714 B1 * 8/2002 McAdam et al. ............ 714/704
2004/0042408 A1 3/2004 Sakai

FOREIGN PATENT DOCUMENTS

EP 0 768 599 4/1997
WO WO 99/46671 9/1999

OTHER PUBLICATIONS

Kimbel, R. W., "In Depth Fibre Channel Arbitration Loop" Northwest Learning Assoc. for Solution Tech., Jan. 1, 1996.
International Search Report.
International Wrtitten Opinion.

* cited by examiner

Primary Examiner—Timothy J Dole
Assistant Examiner—Amy He

(57) ABSTRACT

System stability is managed. It is determined that a data storage system is responsive to an enclosure that is unstable. Based on the determination, the enclosure is temporarily prevented from being added to the data storage system.

16 Claims, 5 Drawing Sheets

MANAGING SYSTEM STABILITY

FIELD OF THE INVENTION

The present invention relates generally to managing system stability.

BACKGROUND OF THE INVENTION

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Most complex electronic devices, including computer systems and networked hardware, are designed with built-in diagnostics. These diagnostics are specifically designed for the system and usually detect a fairly wide range of problems. Sometimes they can also implement fixes or workarounds, or at least pinpoint a problem to speed its repair.

The use of interconnected components, although advantageous for performance and expandability, increases the risk of an error propagating through the system and causing widespread harm in the system.

For example, Fibre Channel ("FC") is a high performance, serial interconnect standard for bi-directional, point-to-point communications between servers, storage systems, workstations, switches, and hubs. Fibre Channel standards are described by the Fibre Channel Industry Association (FCIA) (http:/www.fibrechannel.org). FC supports a variety of upper-level protocols, including the small computer systems interface ("SCSI") protocol. A device is linked to the network through an FC port and copper wires or optical fibres. An FC port includes a transceiver and an interface controller, which conducts lower-level protocol exchanges between the FC channel and the device in which the FC port resides.

Because of the high bandwidth and flexible connectivity provided by FC, FC is a common medium for interconnecting devices within multi-peripheral-device enclosures, such as redundant arrays of inexpensive disks ("RAIDs"), and for connecting multi-peripheral-device enclosures with one or more host computers. These multi-peripheral-device enclosures economically provide greatly increased storage capacities and built-in redundancy that facilitates mirroring and fail over strategies needed in high-availability systems. Although FC is well-suited for this application with regard to capacity and connectivity, FC is a serial communications medium. Malfunctioning peripheral devices and enclosures can, in certain cases, degrade or disable communications. FC-based multi-peripheral-device enclosures are expected to isolate and recover from malfunctioning peripheral devices.

SUMMARY OF THE INVENTION

System stability is managed. It is determined that a data storage system is responsive to an enclosure that is unstable. Based on the determination, the enclosure is temporarily prevented from being added to the data storage system.

One or more implementations of the invention may provide one or more of the following advantages.

A storage system can isolate itself from unstable enclosures and related problems. At least some unnecessary rebuilding or equalizing of data can be prevented. Unstable enclosures can be identified and logged, so that the user can take action accordingly.

Other advantages and features will become apparent from the following description, including the drawings, and from the claims.

DETAILED DESCRIPTION

Figure 1:
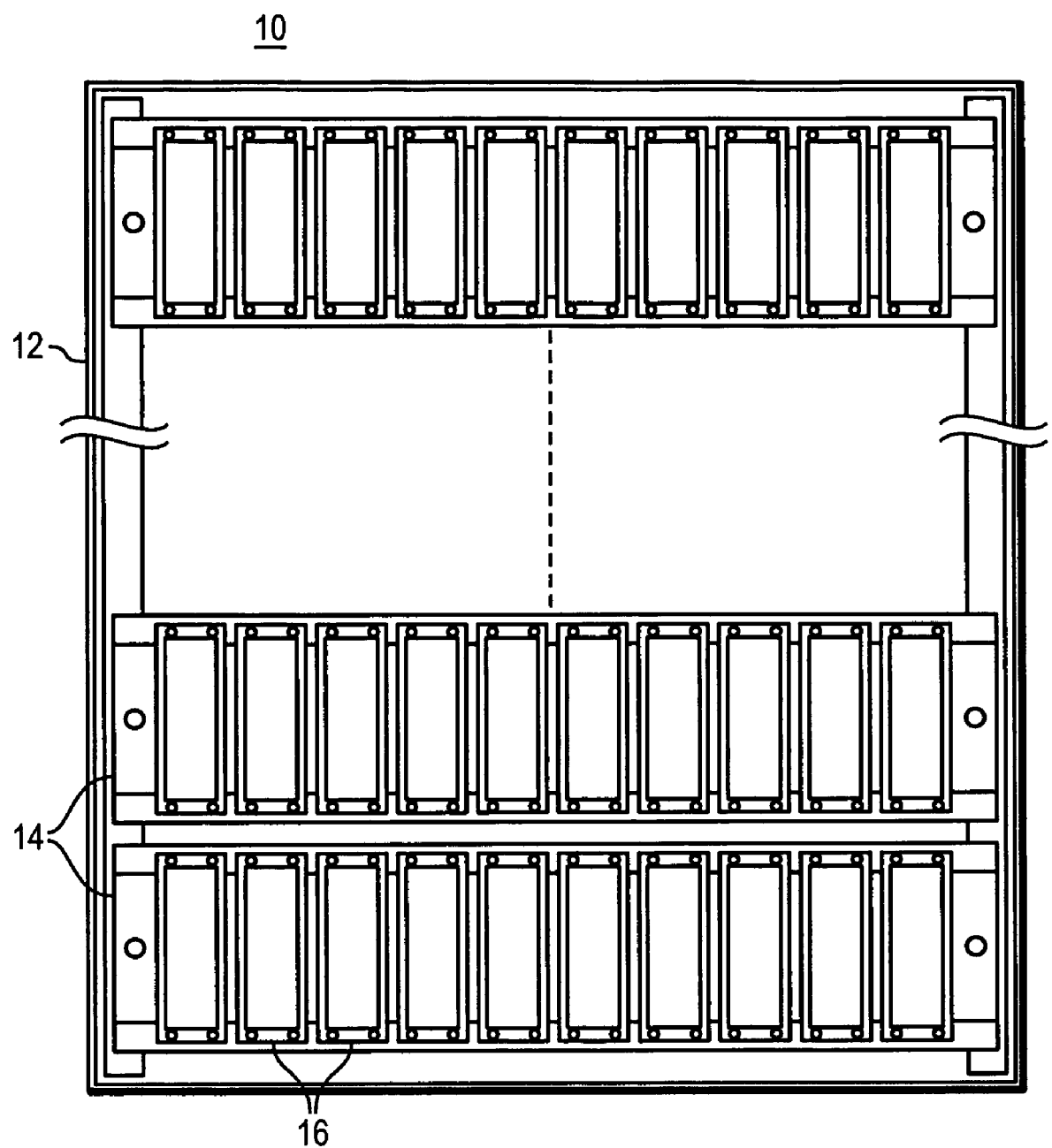
FIG. 1 is a representation of a rack mount system including several storage enclosures.
Figure 2:
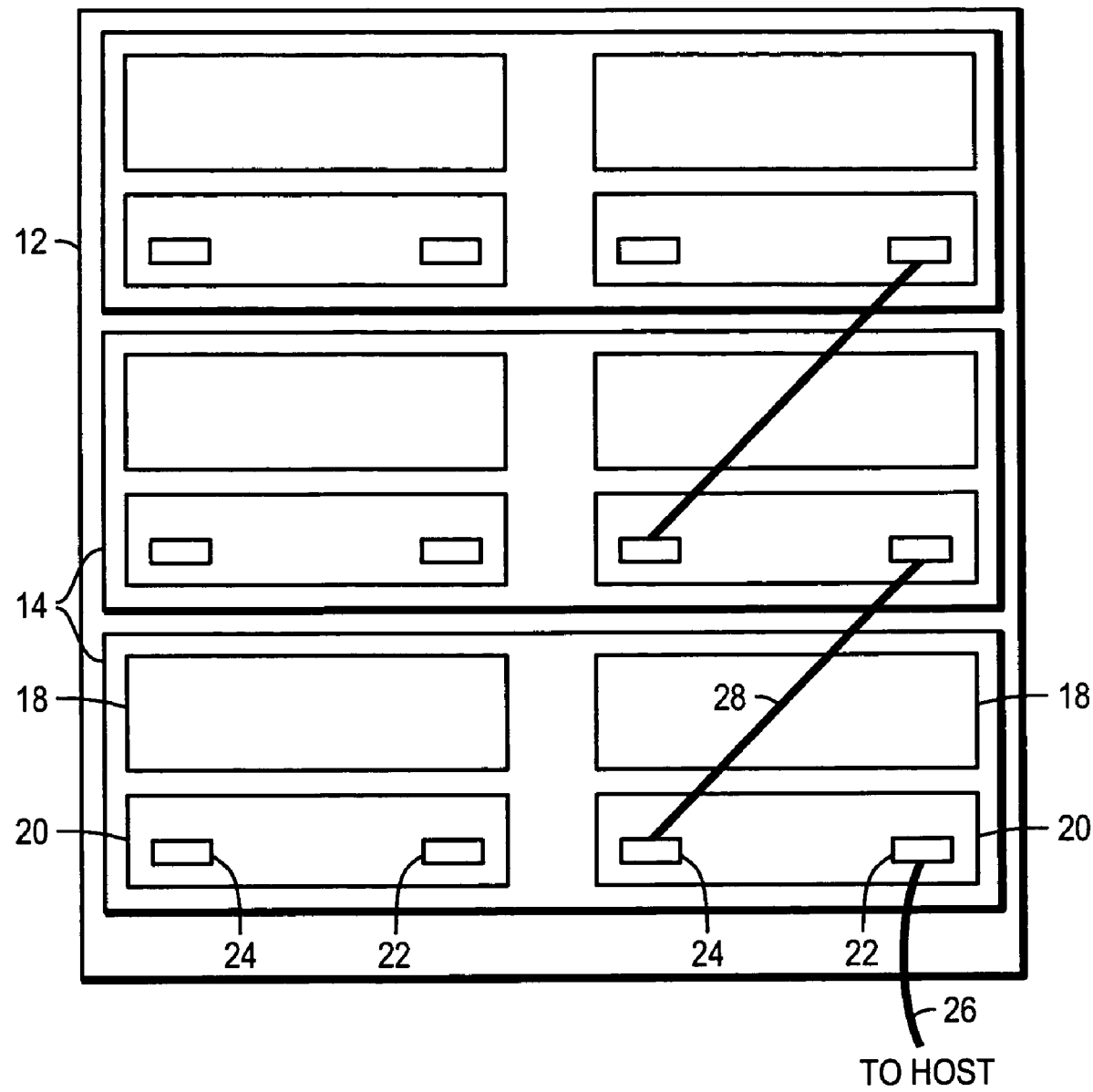
FIG. 2 is a rear view of the rack mount system and storage enclosures of FIG. 1.

Referring to FIG. 1 of the present application, there is shown an example of a storage system 10 in which the present invention may be employed. A rack mount cabinet 12 includes several storage enclosures 14. Each storage enclosure 14 includes several disk drives 16. The disk drives and the enclosures are preferably interconnected via a serial bus loop or ring architecture, e.g., Fibre Channel Arbitrated Loop (FC-AL). In FIG. 2 there is shown a rear view of the rack mount cabinet 12 and the storage enclosure 14. Each storage enclosure includes two power supplies 18, and two link control cards ("LCCs") 20. The power supplies 18 and link control cards 20 are coupled to the disk drives 16 via a midplane within the chassis (not shown in FIG. 2). The link control card 20 serves to interconnect the disks and enclosures on the FC-AL.

Each link control card 20 includes a primary port 22 and an expansion port 24. These ports are used to link the storage enclosures together on a single FC-AL. A cable 26 may come from a host or from another storage system, and plugs into the primary port 22. The FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner in a daisy chain to form the FC-AL. Thus, all the disk drives 16 are interconnected on the same FC-AL.

Each link control card 20 is capable of controlling all the disks 16 in a given enclosure.

Figure 3:
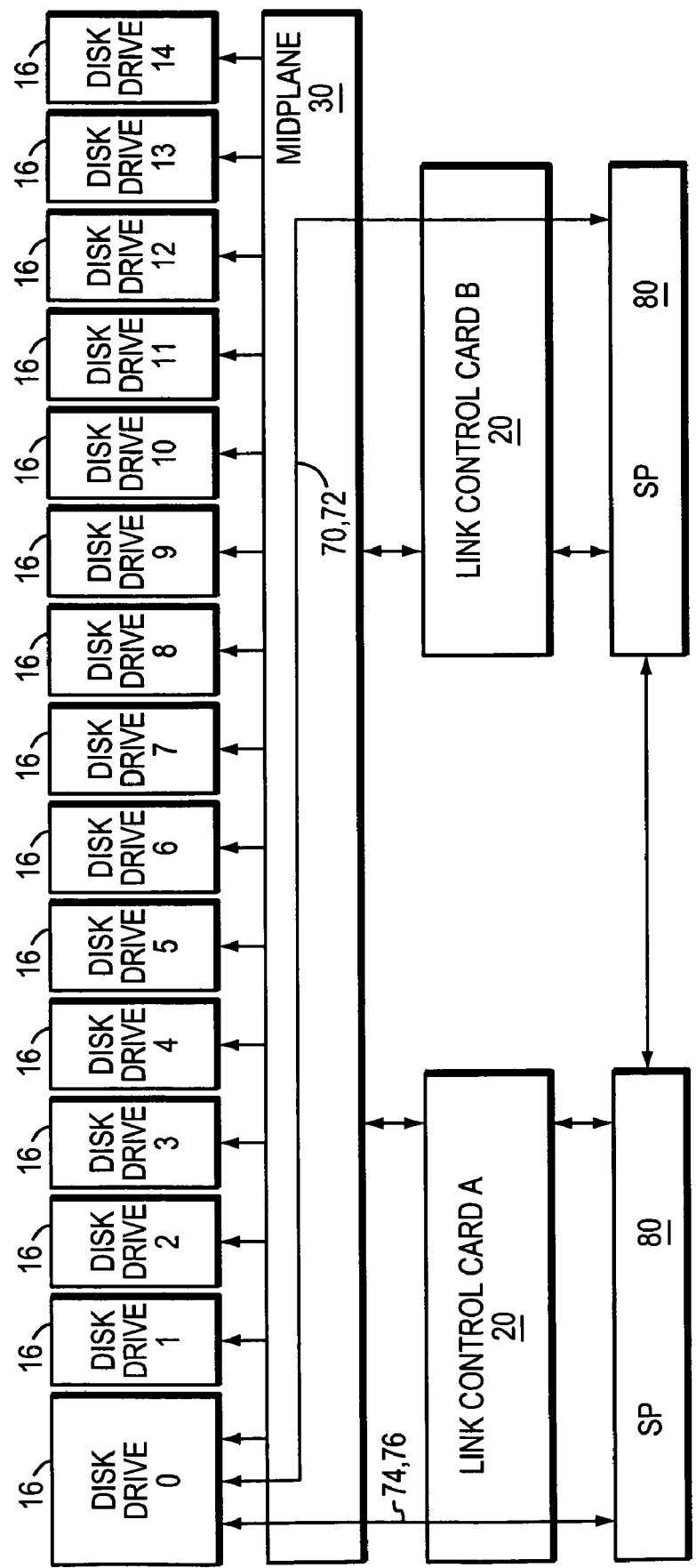
FIG. 3 is a block diagram of components of the rack mount system and storage enclosures of FIG. 1.

FIG. 3 illustrates communication among drives 16, midplane 30, LCCA and LCCB 20, and storage processors (SP) 80. In at least some embodiments, storage processors 80 are controllers within the storage system that control the storage system's access to the storage enclosure, and are configured to communicate with each of drives 16 (exemplified by drive 0 in FIG. 3) over respective Fibre Channel links 74, 70, and over respective diplexing links 76, 72 as described in U.S. Pat. No. 5,901,151 to Bleiweiss, et al. entitled "System for orthogonal signal multiplexing", which is hereby incorporated herein by reference in its entirety.

The system may include a diagnostic section (which may be included within the SPs) which regularly polls the enclosures at a rate of typically 500 milliseconds, and can communicate with an enclosure not yet added to the FC-AL, e.g., by using the diplexing links. In a particular example, such communication could use a diplexed signal which is a transmission comprising two distinct signals that have been modulated together and transmitted over a single transmission wire. The signals are generally transmitted at frequencies and may also be transmitted at different voltage levels. One example of a diplexed signal is the piggybacking of an RS232 protocol signal over Fibre Channel protocol signal lines, which may be done in storage area networked environments. The RS232 protocol is a standard for serial transmission of data between two devices, normally carrying between ±5V and ±12V on both data and control signal lines. The Fibre Channel signals generally have a lower voltage. The diplexed signals are typically separated at their destinations by a filter device into the RS232 and Fibre Channel signals, and forwarded as appropriate.

In a storage system lacking an enclosure handling technique described below, an enclosure may be automatically removed from and added back again to the serial bus loop or ring architecture (i.e., removed from and added to the FC-AL) repeatedly as a result of a problem (e.g., an intermittent problem) with a cable, LCC, or midplane. For example, when the system does not receive a satisfactory response (e.g., any response) to a status query or poll directed to an enclosure or an enclosure component, which may be due to a cable, LCC, or midplane problem, the system may act to remove the enclosure, and then may subsequently allow the enclosure to be added again. Since the enclosures are daisy chained, all of the enclosures behind the removed enclosure in the chain are also removed. Repeatedly removing and adding the enclosure is disruptive and can cause problems for other enclosures behind and in front of the enclosure in the chain. Since the system is processing the enclosure removal and addition repeatedly, it is less able to process I/O efficiently and this results in performance degradation to the user. Repeated removal and addition can also cause data rebuilds to start and stop disruptively. Also, in at least some cases, repeated removal and addition can cause storage processors to crash and/or could lead to a data loss/data unavailable situation.

Generally in accordance with the enclosure handling technique, an unstable enclosure is identified and is not allowed to be added to the system. By not allowing the unstable enclosure to be added, the performance of the system remains unaffected, storage processors remain up and running, and a potential data loss/data unavailable situation is avoided. At the same time, the enclosure handling technique is configured to distinguish between (1) removal and addition activity due to an unstable enclosure and (2) normal removal and addition activity with a healthy enclosure, e.g., by the user.

In a specific embodiment of the enclosure handling technique, an enclosure is deemed unstable if it is being removed and added back excessively frequently. For example, under timing conditions, an enclosure may be deemed unstable if, within a given period of time (e.g., 10 minutes) ("tracking period"), the enclosure is being removed and added back quickly (e.g., within 6 seconds) at least a specific number of times (e.g., 5 times).

Once the enclosure is deemed unstable, the enclosure is not added. If the unstable enclosure stays removed (e.g., is kept removed by the user) for longer than the tracking period, the enclosure is then allowed to be added (since, for example, the user could have replaced or repaired it).

Figure 4:
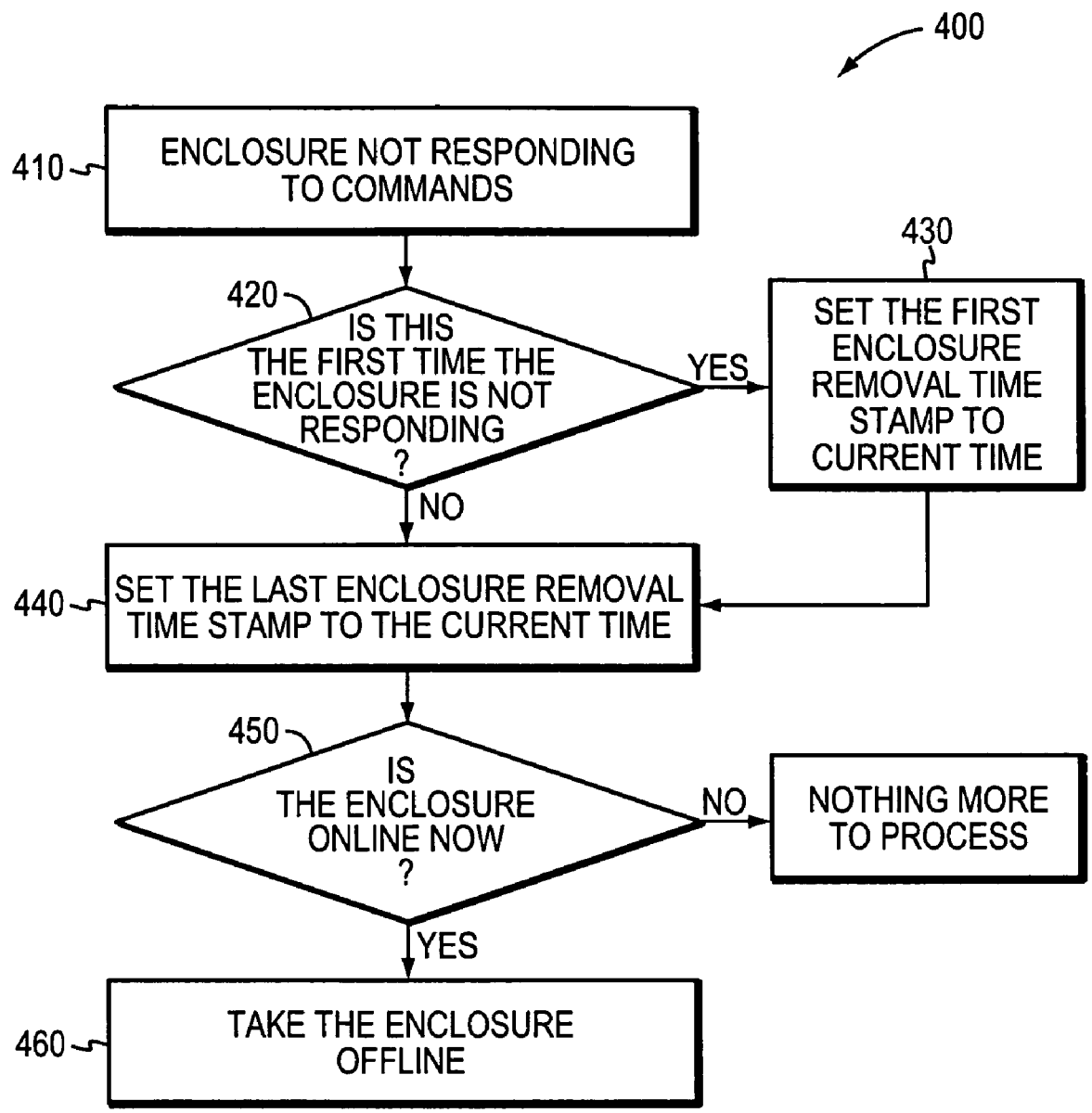
FIG. 4 is a flow chart of a procedure for use in enclosure removal of an enclosure of the system of FIG. 1 in accordance with the invention.

FIG. 4 illustrates a sample procedure 400 for use in enclosure removal in accordance with the enclosure handling technique.

It is determined that an enclosure is not responding to commands and is therefore being removed (step 410).

It is determined whether this is the first time this enclosure is being removed (step 420).

If so, a first enclosure removal time stamp is updated to the current time, indicating the first time of removal (step 430).

Whether or not this is the first time this enclosure is being removed, a last enclosure removal time stamp is updated to the current time (step 440). As described below, the two time stamps are used later (i.e., when there is an attempt to add the enclosure), to determine whether the enclosure satisfies the timing conditions.

If the storage system has internal data indicating that the enclosure is currently on the serial bus loop or ring architecture (step 450), but the enclosure is currently not on the serial bus loop or ring architecture (as per step 410), remove the enclosure by clearing the internal data (step 460). If the enclosure is already deemed unstable and is already removed, no further action is needed.

Figure 5:
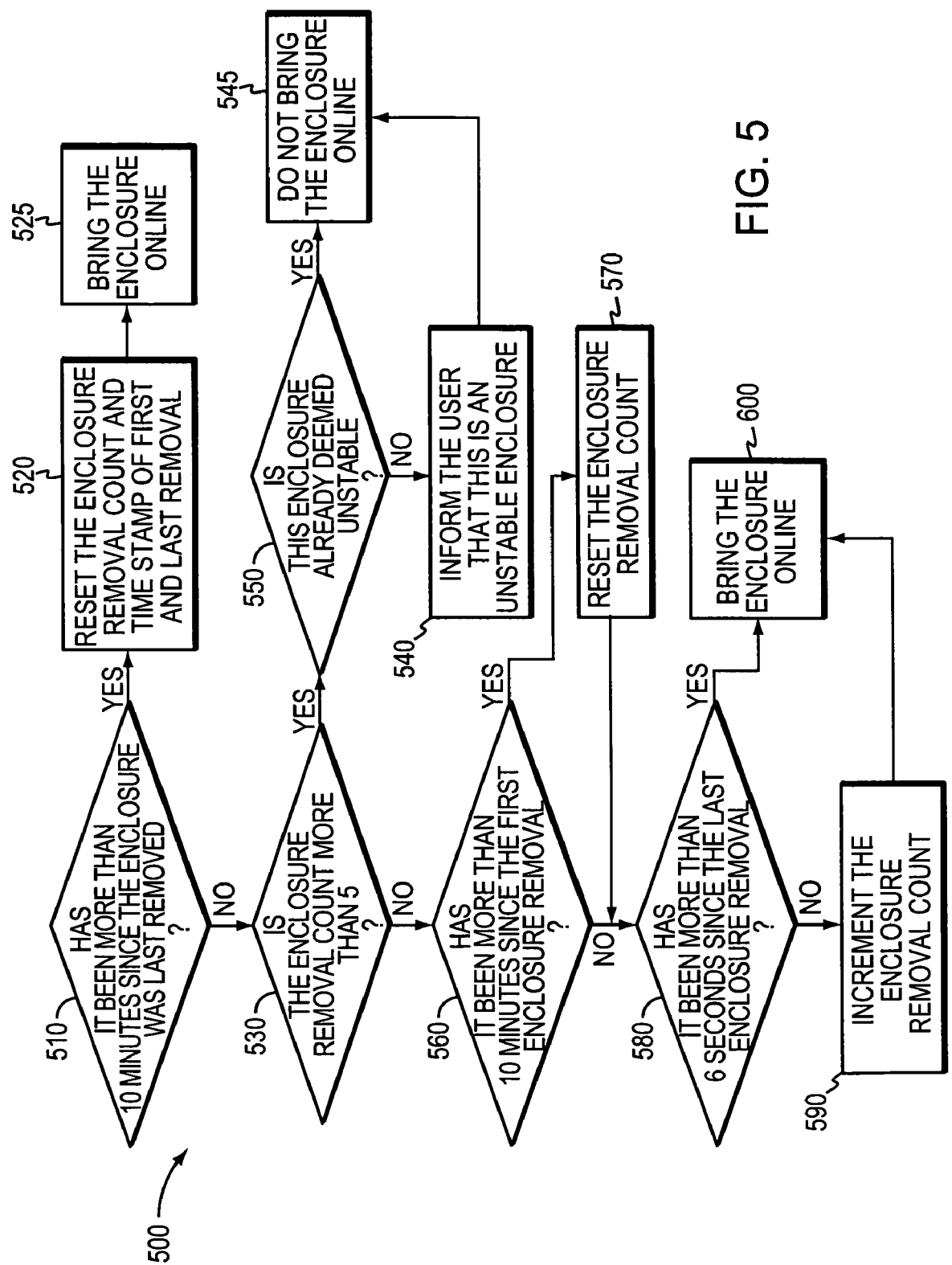
FIG. 5 is a flow chart of a procedure for use in enclosure addition in the system of FIG. 1 in accordance with the invention.

FIG. 5 illustrates a sample procedure 500 for use in enclosure addition in accordance with the enclosure handling technique, together with procedure 400.

When an attempt is made to add the enclosure, it is determined whether 10 minutes have elapsed since the enclosure was last removed (step 510).

If so, the first and last enclosure removal time stamps are reset and an enclosure removal count is reset (step 520), and the enclosure is allowed to be added (step 525), as this could be a new enclosure.

If it has been less than 10 minutes, it is determined whether the enclosure removal count is more than 5 (step 530).

If it is more than 5, it is determined that this is an unstable enclosure. If this enclosure has already been declared as unstable (step 550), there is nothing more to do and the enclosure will not be added (step 545). If this enclosure has not already been declared as unstable, the user is informed (e.g., by log entries) that the enclosure is unstable (step 540) and the enclosure will not be added (step 545).

If the enclosure removal count is less then 5, it is determined whether it has been more than 10 minutes since the first occurrence of enclosure removal (step 560). If so, the enclosure removal count is set to zero (step 570), to support keeping track of whether the enclosure is being removed and added 5 times within a 10 minute period.

If the enclosure is being added within 6 seconds of when it was removed (step 580), the enclosure removal count is incremented (step 590), to help support a potential later determination that this is an unstable enclosure.

Regardless of whether the enclosure is being added within 6 seconds of when it was removed, the enclosure is allowed to be added at this point (step 600).

In at least one embodiment, removal of an unstable enclosure from the daisy chain may be accomplished by issuing a management command to the immediately preceding enclosure in the chain, to shunt the serial bus loop or ring architecture to remove the unstable enclosure from the serial bus loop or ring architecture.

Other embodiments are within the scope of the following claims. For example, different timing conditions may used, including a shorter or longer tracking period, a shorter or longer notion of quickness for the enclosure being removed and added back quickly (i.e., other than within 6 seconds), and/or a different specific number of times (i.e., other than 5 times). Depending on the architecture and/or its capabilities such as its peer to peer capabilities, one or more enclosures behind the unstable enclosure, and/or part of the unstable enclosure, may be retained when the unstable enclosure is removed. The serial number of a bad component may be stored and if the same component is added back again, the enclosure may not be allowed to be added back.

What is claimed is:

1. A method comprising:
   determining whether an enclosure in an enclosure slot of a system is in an unstable condition, such unstable condition being determined if the enclosure in such slot has been temporarily removed from the system for a first period of time and then added back into the system a predetermined number of times over a predetermined tracking period;
   removing the unstable enclosure in the enclosure slot from the system; and
   determining whether the unstable enclosure has been removed from the slot for a time period greater than the tracking period and if so determined adding an enclosure in the enclosure slot into the system.

2. The method of claim 1, further comprising:
   determining that the enclosure is unstable when a satisfactory response is not received to a status query directed to the enclosure.

3. The method of claim 1, further comprising:
   based on the determination of an unstable enclosure, temporarily preventing all other enclosures behind the removed enclosure from being added to the system.

4. The method of claim 1, further comprising:
   distinguishing between (1) removal and addition activity due to the unstable enclosure and (2) normal removal and addition activity with a healthy enclosure.

5. The method of claim 1, further comprising:
   updating a time stamp to the current time, indicating the first time of removal.

6. The method of claim 1, further comprising:
   updating a time stamp to the current time, indicating the last time of removal.

7. The method of claim 1, further comprising:
   updating at least one time stamp to the current time, indicating a time of removal; and
   using the at least one time stamp to determine whether the enclosure satisfies timing conditions for being added.

8. The method of claim 1, further comprising:
   if internal data of the system incorrectly indicates that the enclosure is currently on a serial bus architecture, removing the enclosure by clearing the internal data.

9. The method of claim 1, further comprising:
   determining whether a specified period of time has elapsed since the enclosure was last removed.

10. The method of claim 1, further comprising:
    if a specified period of time has not elapsed since the enclosure was last removed, determining whether an enclosure removal count is excessive.

11. The method of claim 1, further comprising:
    if a specified period of time has not elapsed since the enclosure was last removed and an enclosure removal count is excessive, determining that the enclosure is unstable.

12. The method of claim 1, further comprising:
    informing the user that the enclosure is unstable.

13. The method of claim 1, further comprising:
    incrementing an enclosure removal count if the enclosure is being added within a specified number of seconds of when it was removed.

14. The method of claim 1, further comprising:
    allowing the enclosure to be added regardless of whether the enclosure is being added within a specified number of seconds of when it was removed.

15. The method of claim 1, further comprising:
    removing an unstable enclosure from a daisy chain by issuing a management command to the immediately preceding enclosure in the chain, to shunt a serial bus architecture to remove the unstable enclosure.

16. A method for use in a system having a plurality of serially interconnected enclosure positions, such method comprising:
    determining whether one of the enclosure positions has been electronically removed from the system and then electronically added back onto the system a predetermined number of times over a predetermined tracking period;
    if the one of the positions is determined to have been electronically removed from the system the predetermined number of times over the predetermined tracking period, electronically removing the position from the system until such position has been electronically removed from the system for a period of time greater than the predetermined tracking period and then electronically adding the position back into the system.

* * * * *